2,868,836

2,4-DIHYDROXY-3-METHYLPHENYLGLYOXYLIC ACID AND DERIVATIVES THEREOF

Edward A. Kaczka, Union, N. J., John W. Richter, Wilmington, Del., and Clifford H. Shunk, Scotch Plains, N. J., assignors to Merck & Co., Inc., Rahway, N. J., a corporation of New Jersey No Drawing. Application April 19, 1956
Serial No. 579,131

2 Claims. (Cl. 260—521)

This invention relates to a novel phenylglyoxylic acid and its esters and salts. More particularly, it is concerned with 2,4-dihydroxy-3-methylphenylglyoxylic acid, esters and salts thereof, and methods of preparing these compounds.

The novel compounds of the present invention, namely, 2,4-dihydroxy-3-methylphenylglyoxylic acid and its esters and salts, are valuable compounds having bactericidal properties. In addition, these compounds are also valuable in the field of synthetic chemistry and may be useful as intermediates in the synthesis of antibioticly active compounds.

It is an object of the present invention to provide 2,4-dihydroxy-3-methylphenylglyoxylic acid and its esters and salts. Another object is to provide methods of preparing these new compounds. Other objects will be apparent from the detailed description of this invention hereinafter provided.

In accordance with an embodiment of the present invention, it is now found that 2,4-dihydroxy-3-methylphenylglyoxylic acid is produced by the reaction of 2-methylresorcinol with ethyl oxalyl chloride in the presence of aluminum chloride. This reaction is conveniently carried out in a solvent such as nitrobenzene preferably at a temperature below about 25° C. In carrying out this reaction, it is preferred to employ about two equivalents of aluminum chloride per mole equivalent of the reactants, since it is found that optimum yields of the desired product are obtained under these conditions. Thus, the reaction is readily effected by adding two equivalents of aluminum chloride to a solution of equal molecular amounts of 2-methylresorcinol and ethyl oxalyl chloride in nitrobenzene with stirring, and allowing the resulting reaction mixture to stand at room temperature for sufficient time to complete the reaction.

The desired product, 2,4-dihydroxy-3-methylphenylglyoxylic acid, is conveniently recovered from the resulting reaction mixture by acidifying the mixture with cool dilute acid, distilling off the solvent, extracting the resulting acidified aqueous solution with a suitable solvent such as ether, and evaporating the resulting solvent solution. Alternatively, during this extraction procedure the product can be purified by extracting the solvent solution with an aqueous solution of an alkali, acidifying the resulting aqueous solution of the salt of 2,4-dihydroxy-3-methylphenylglyoxylic acid, re-extracting this acidified solution with ether and concentrating the resulting ether solution to dryness. If desired, the product can be still further purified by recrystallization from suitable solvents such as dilute hydrochloric acid, benzene, and the like.

2,4-dihydroxy-3-methylphenylglyoxylic acid can be esterified, for example, by reacting the acid with an alcohol in the presence of a small amount of acid, to produce the corresponding ester. Thus, in this manner esters of alcohols containing 1–10 carbon atoms such as the methyl, ethyl, propyl, butyl, amyl, and the benzyl esters can be obtained.

These esters as well as the free acid and its salts such as the alkali metal salts are valuable bactericidal agents. Thus, these products are active in inhibiting the growth of various microorganisms such as *K. pneumoniae*, *Sh. dysenteriae*, *S. typhosa*, *E. coli*, *M. pyogenes*, *D. pneumoniae*, *Strep. faecalis*, *Strep. pyogenes*, and *P. vulgaris* #1. For example, a solution of 10 mg. of 2,4-dihydroxy-3-methylphenylglyoxylic acid per ml. of water is effective in inhibiting the growth of these and other microorganisms. Therefore, solutions of 2,4-dihydroxy-3-methylphenylglyoxylic acid or its esters or salts in concentrations ranging from about 1–10% are valuable germicides.

The following example is presented to illustrate a method of preparing 2,4-dihydroxy-3-methylphenylglyoxylic acid.

EXAMPLE 1

*Preparation of 2,4-dihydroxy-3-methylphenylglyoxylic acid*

To a solution of 4.95 g. (0.04 mole) of 2-methylresorcinol and 5.4 g. (0.04 mole) of ethyl oxalyl chloride in 50 ml. of nitrobenzene cooled to 0° C., 10.5 g. (0.08 mole) of aluminum chloride was added in portions with stirring. After the addition of aluminum chloride was completed, the mixture was kept at room temperature for fifteen hours. The reaction mixture was poured on to 160 g. of cracked ice containing 20 ml. of concentrated hydrochloric acid. This mixture was steam distilled to remove nitrobenzene, cooled in an ice bath, and extracted three times with 250 ml. portions of ether. The ether layers were combined and extracted three times with 200 ml. portions of a saturated aqueous solution of sodium bicarbonate. The sodium bicarbonate extracts were combined, cooled in an ice bath, and carefully acidified to pH 2.0 with concentrated hydrochloric acid. The phenylglyoxylic acid was extracted from the aqueous solution with three 250 ml. portions of ether. The ether extract was dried over anhydrous magnesium sulfate, filtered, and concentrated in vacuo. The orange colored residue was crystallized from a large volume of hot benzene to give 2,4-dihydroxy-3-methylphenylglyoxylic acid as a polymorphic crystalline mixture; M. P. 137–9°; weight 4.8 g. (62%). The phenylglyoxylic acid was dissolved readily in warm water and caused to crystallize by adding a few ml. of concentrated hydrochloric acid. The yellow needles recrystallized from dilute hydrochloric acid in this manner melted at 147–9° C.

*Analysis.*—Calc'd for $C_9H_8O_5$: C, 55.11; H, 4.08. Found: C, 55.07; H, 4.12.

2,4-dihydroxy-3-methylphenylglyoxylic acid can be obtained on recrystallization from benzene as orange prisms melting at 144–7° or as yellow needles; M. P. 131–4°. The reaction product can be recrystallized most satisfactorily from dilute hydrochloric acid.

Upon reacting 2,4-dihydroxy-3-methylphenylglyoxylic acid with an equivalent weight of a base in aqueous solution and evaporating the resulting solution the corresponding salt is obtained. Thus, when an alkali metal hydroxide, such as sodium hydroxide or potassium hydroxide, is reacted with the glyoxylic acid, the corresponding alkali metal salt is obtained. Similarly, when other alkalis or organic bases such as an amine is used, the corresponding salt is produced.

Esters of 2,4-dihydroxy-3-methylphenylglyoxylic acid are prepared by heating the acid with an excess of an alcohol in the presence of a small amount of an acid. After the esterification is complete the ester can be recovered by neutralizing the resulting solution, evaporating the excess solvent and recovering the ester by distillation under reduced pressure. Thus, in this way the methyl, ethyl, propyl, butyl and benzyl esters are prepared.

Various changes and modifications of the invention can be made and, to the extent that such variations incorporate the spirit of this invention, they are intended to be included within the scope of the appended claims.

What is claimed is:

1. A compound from the group consisting of 2,4-dihydroxy-3-methylphenylglyoxylic acid, its lower alkyl esters, and its alkali metal salts.

2. 2,4-dihydroxy-3-methylphenylglyoxylic acid.

References Cited in the file of this patent

Thomas: "Anhydrous Aluminum Chloride in Org. Chem.," pp. 252, 304 and 329 (1941).